Feb. 8, 1966 J. G. WRIGHT ETAL 3,233,811
FASTENER FORMING AND INSERTING MACHINE
Filed Jan. 29, 1963 12 Sheets-Sheet 1

INVENTORS
JOHN G. WRIGHT &
ROY E. SMITH
BY
Channing L. Richards &
Dalbert U. Shefte
ATTORNEYS

INVENTORS
JOHN G. WRIGHT &
ROY E. SMITH
ATTORNEYS

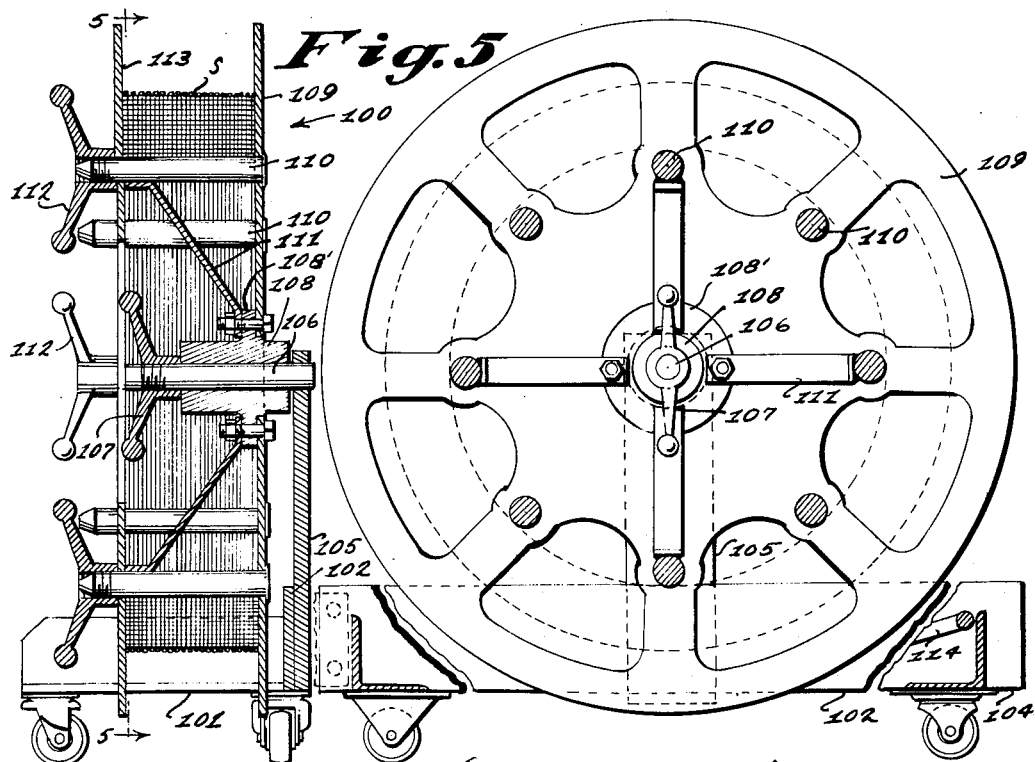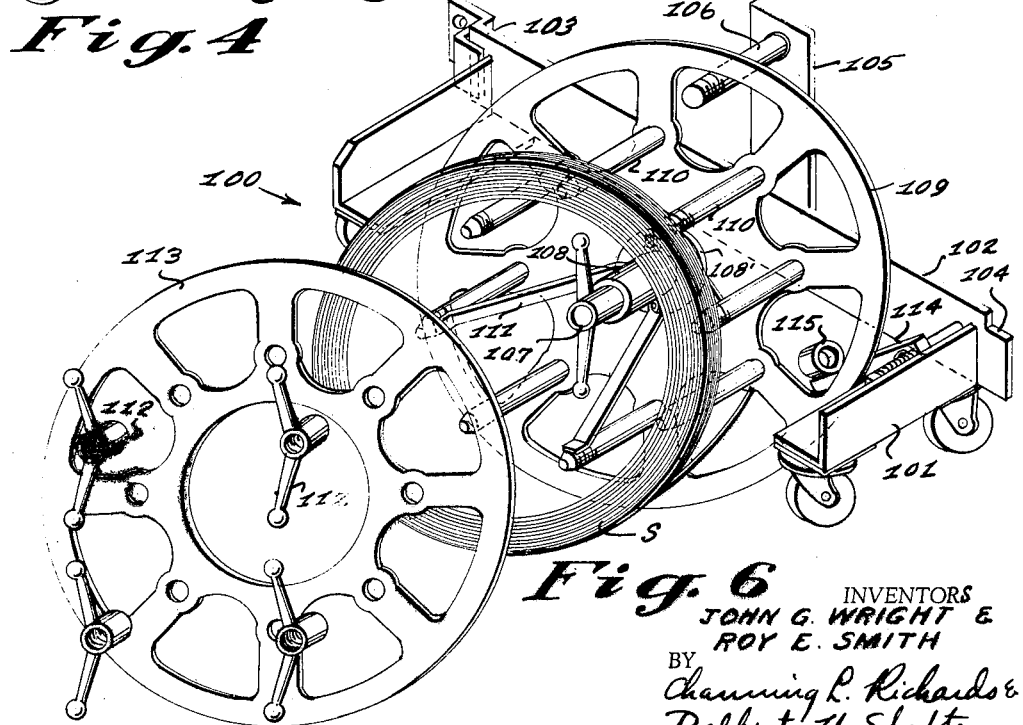

Feb. 8, 1966 J. G. WRIGHT ETAL 3,233,811
FASTENER FORMING AND INSERTING MACHINE
Filed Jan. 29, 1963 12 Sheets-Sheet 5

INVENTORS
JOHN G. WRIGHT &
ROY E. SMITH
BY Channing P. Richards &
Dalbert U. Shefte
ATTORNEYS

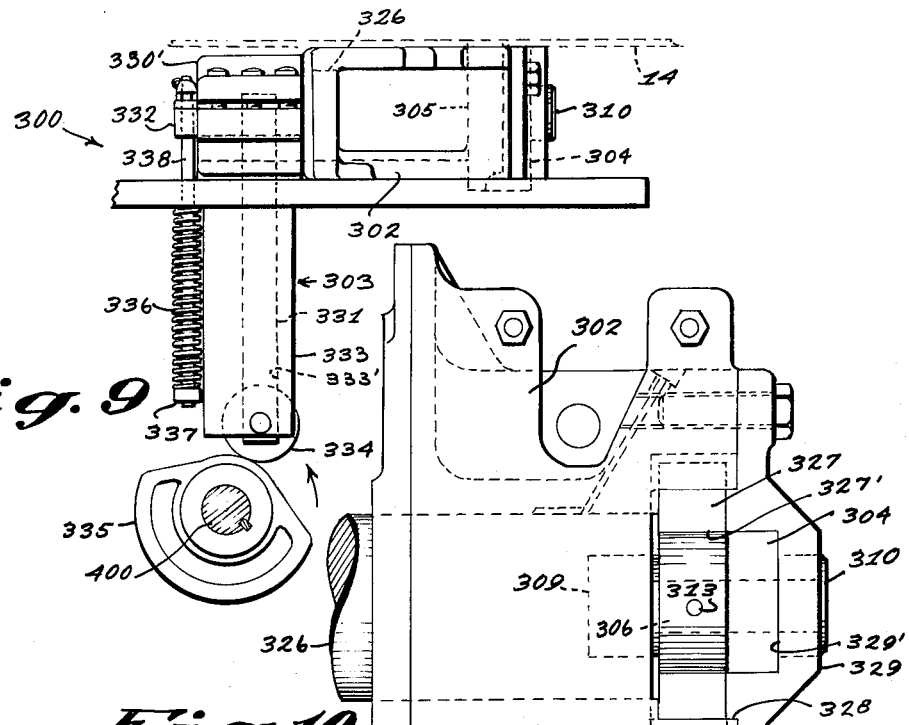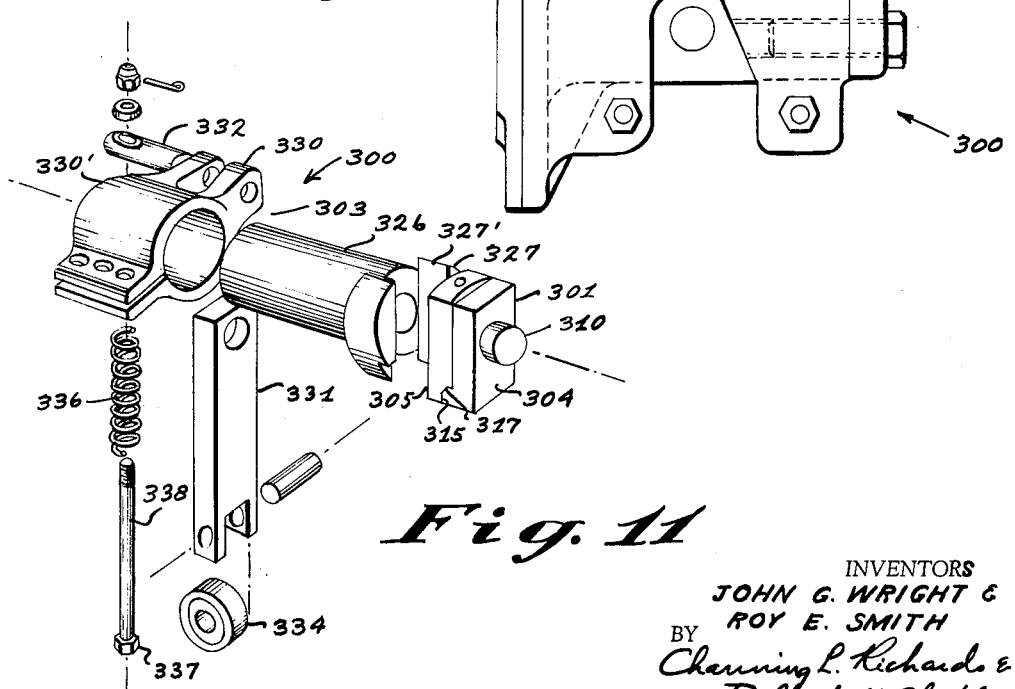

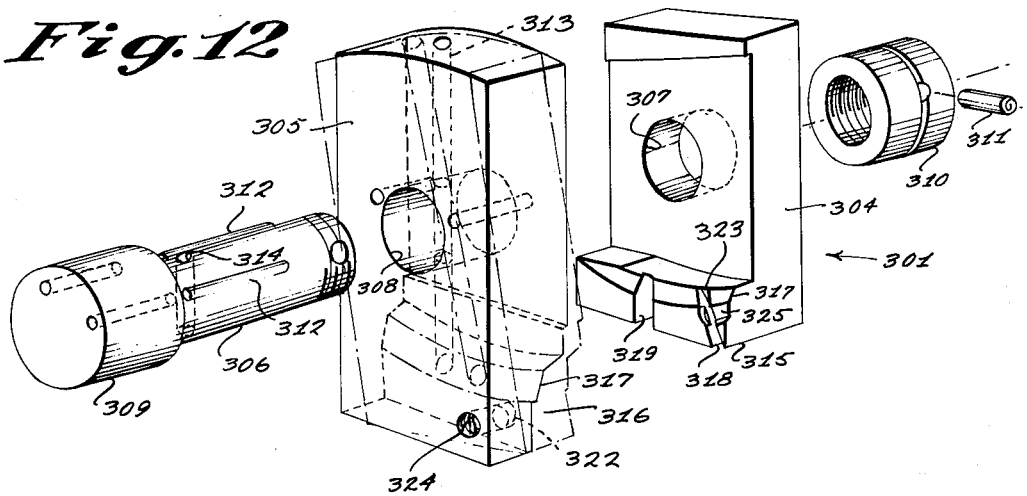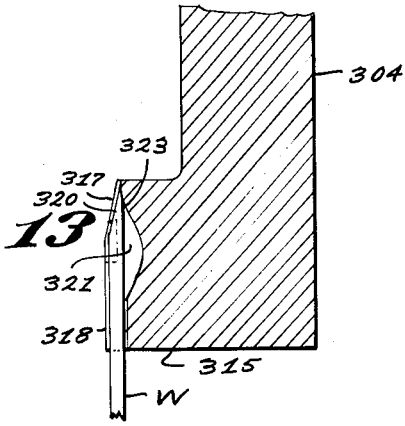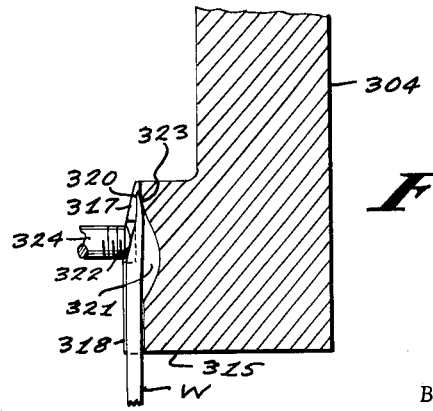

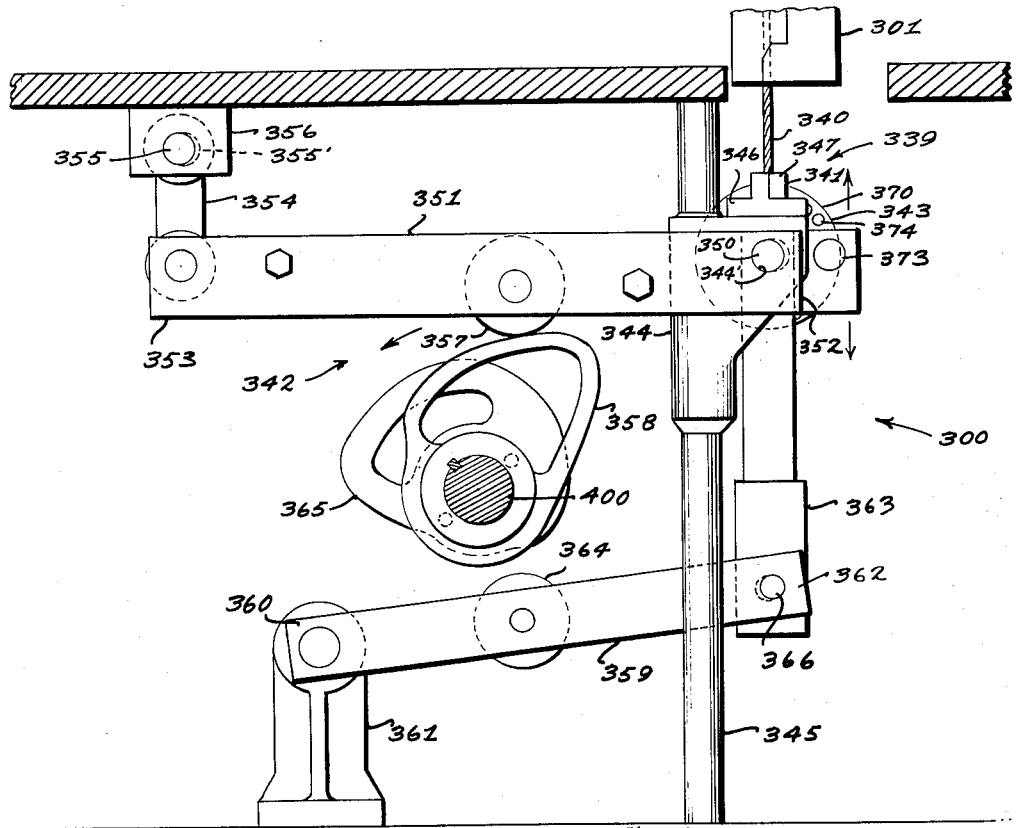
Fig. 15
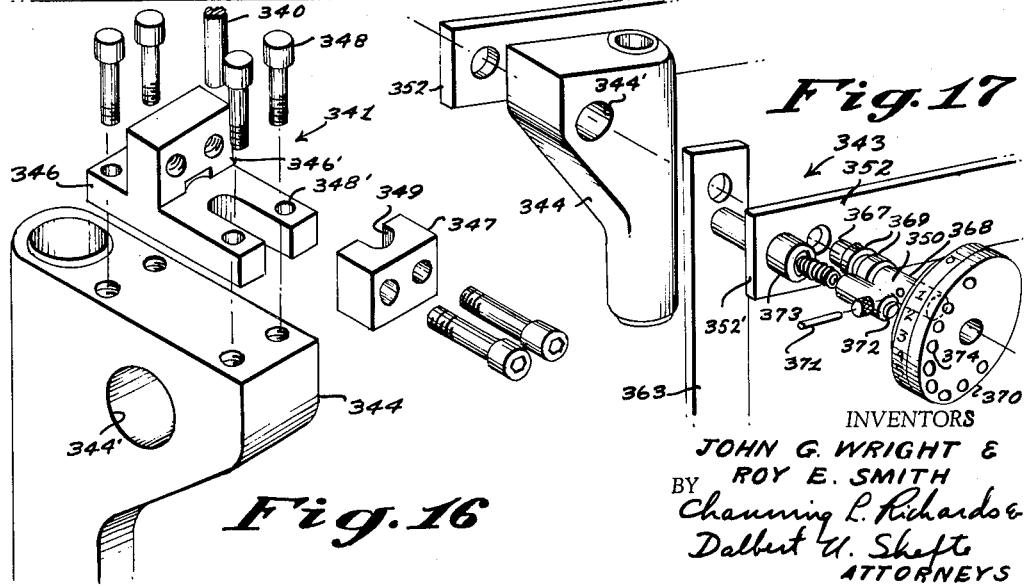
Fig. 17
Fig. 16
INVENTORS
JOHN G. WRIGHT &
ROY E. SMITH
BY Channing L. Richards &
Dalbert U. Shefte
ATTORNEYS Feb. 8, 1966   J. G. WRIGHT ETAL   3,233,811
FASTENER FORMING AND INSERTING MACHINE
Filed Jan. 29, 1963   12 Sheets-Sheet 9
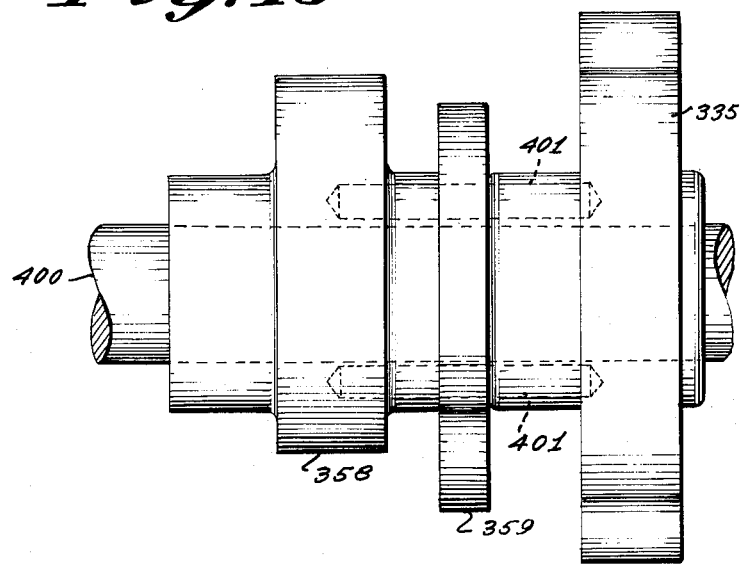
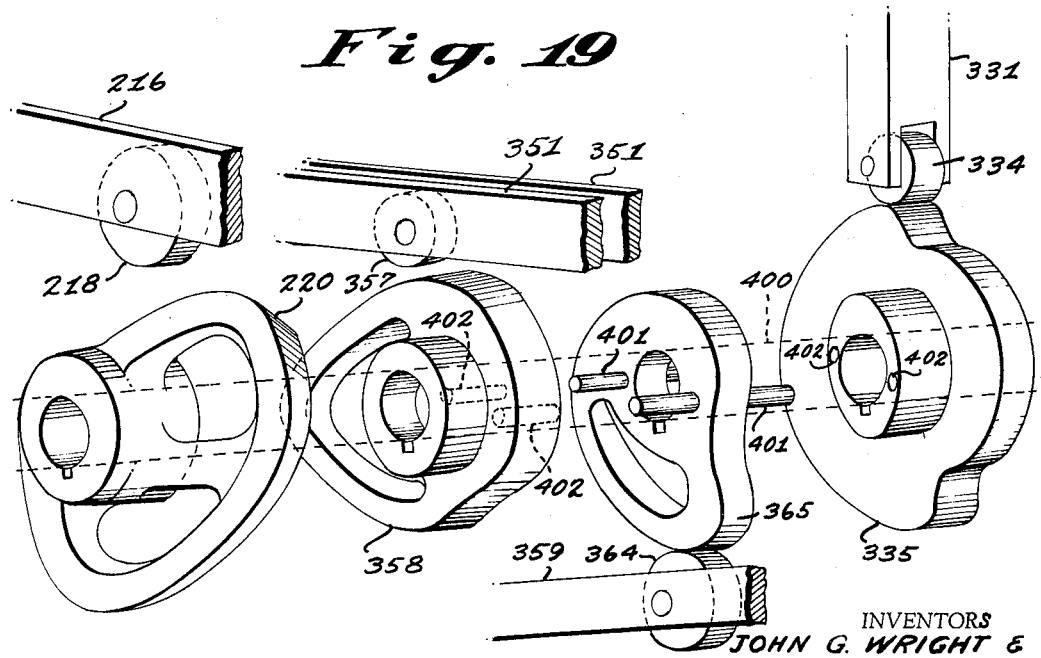
INVENTORS
JOHN G. WRIGHT &
ROY E. SMITH
BY
Channing L. Richards &
Dalbert U. Shefte
ATTORNEYS

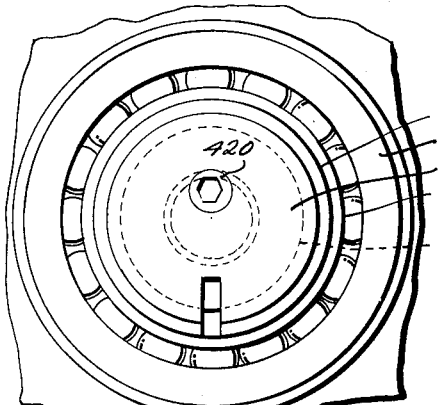
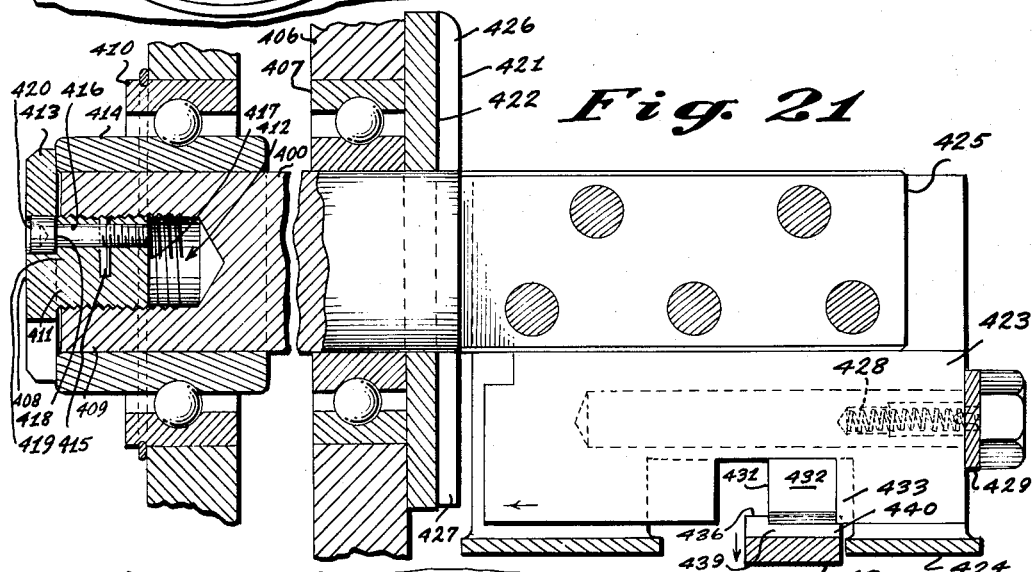
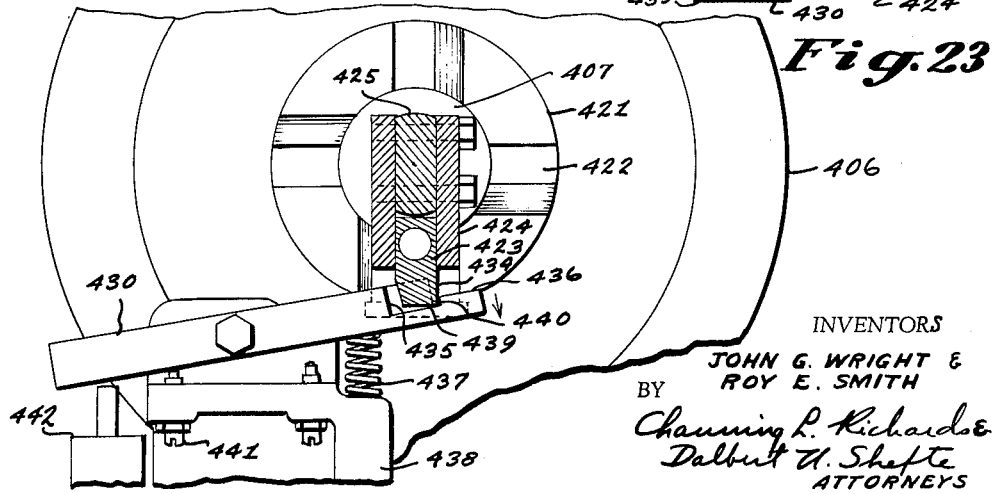

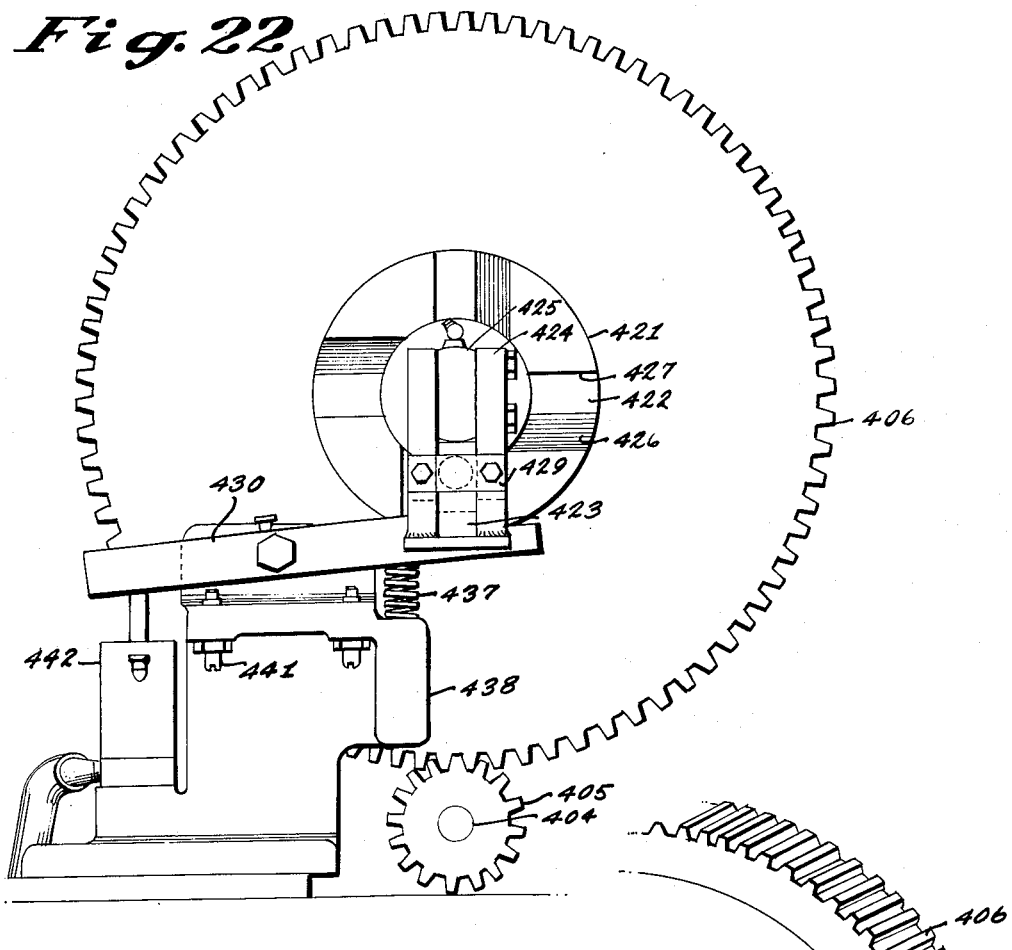
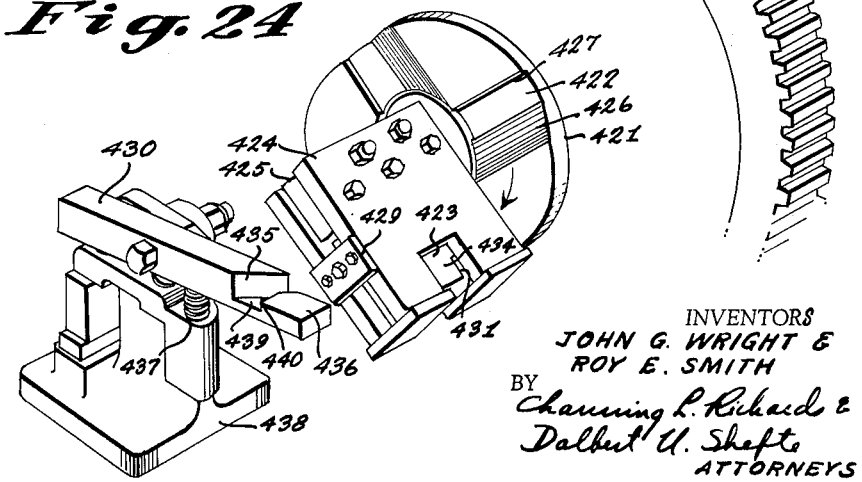

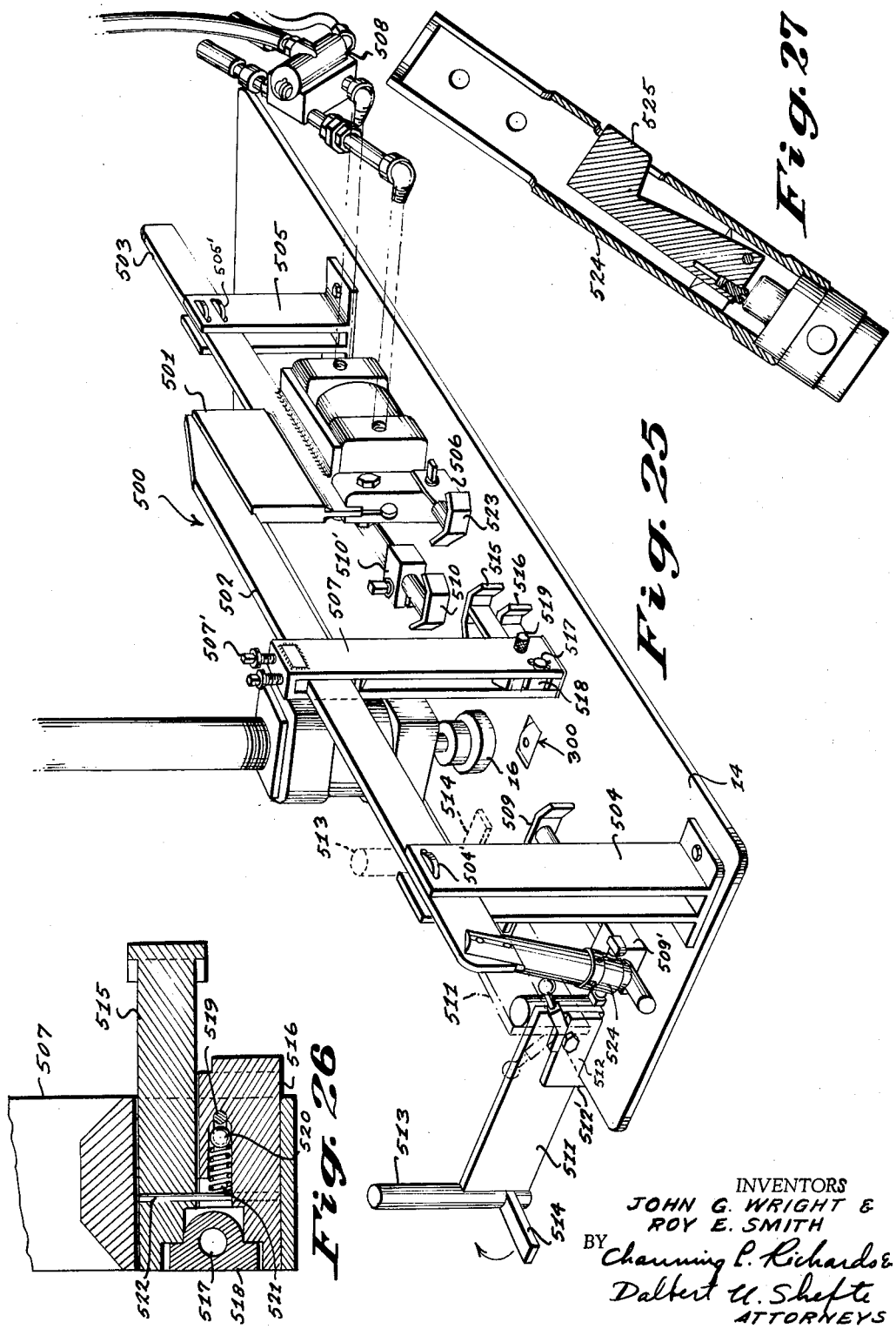

3,233,811
FASTENER FORMING AND INSERTING MACHINE
John G. Wright and Roy E. Smith, Atlanta, Ga., assignors to The Auto-Soler Company, a corporation of Georgia
Filed Jan. 29, 1963, Ser. No. 255,155
13 Claims. (Cl. 227—80)

This invention relates to machines of the type in which wire is fed in a continuous length from a reel supply to have fasteners formed successively therefrom, and in which each of the successively formed fasteners is driven or inserted in material to be secured as a following phase of a cyclic fastener forming and inserting operation.

More particularly, the present invention is concerned with a machine of the foregoing type that incorporates a unique rearrangement of the basic structural and operating relations to provide for the formation and insertion of much longer and heavier fasteners than has heretofore been possible with such machines.

Thus, the machine of the present invention is capable of forming fasteners from 8 or 10 gauge wire in any length up to 5¼ inches, which is equivalent to a fortypenny length, and may accordingly be employed to exceptional advantage for nailing heavy duty structures such as skids or shipping pallets or truck platforms; for producing housing sub-components of all sorts; and for use otherwise in any instance where a long and substantial fastener is needed or desirable, as in the securing of plywood sheets in stacks for production sawing.

Briefly described, the machine is rearranged according to the present invention: to deal with unusual problems encountered in handling the reel supply, which needs to have a size corresponding to a weight of about 200 pounds in order to allow a reasonable period of operation before replacement is needed; to provide for feeding the exceptionally heavy and stiff wire properly from the reel supply to the fastener forming means; to construct and operate the fastener forming means so that the substantially greater strength and power requirements are obtained advantageously in forming and inserting the fasteners; to control and actuate the cyclic fastener forming and inserting operation conveniently and effectively despite the relatively great operating forces that must be transmitted and directed; and to accommodate and position work at the machine for insertion of the fasteners therein to the best advantage.

The aforementioned reel supply feature is disclosed in detail and claimed in copending application Serial No. 448,434, filed April 15, 1965, as a division of the present application. The aforementioned wire feeding feature is disclosed in detail and claimed in copending application Serial No. 448,764, filed April 16, 1965, as a division of the present application. The aforementioned fastener forming feature is disclosed in detail and claimed in copending application Serial No. 448,472, filed April 15, 1965, as a division of the present application. Clutch means of the aforementioned control of the cyclic operation of the machine is disclosed in detail and claimed in copending application Serial No. 448,473, filed April 15, 1965, also as a division of the present application.

The features of the present invention are described at further length below in relation to the accompanying drawings, in which:

FIG. 4 is a vertical sectional view through the center line of the wire reel structure for the fastener forming and inserting machine of FIG. 1;

FIG. 5 is a vertical sectional view of the wire reel structure of FIG. 4, taken along line 5—5 of FIG. 4;

FIG. 6 is an exploded perspective view of the wire reel structure showing the elements disassembled for mounting of a coil of wire thereon;

FIG. 9 is a side elevational view of the knife assembly employed in the forming and inserting machine of FIG. 1;

FIG. 10 is a top plan view of the forward portion of the knife assembly of FIG. 9;

FIG. 11 is an exploded perspective view of the knife assembly of FIG. 9;

FIG. 12 is an enlarged exploded perspective view of the composite knife block unit of the knife assembly of FIG. 9;

FIG. 13 is an enlarged sectional view through the wire feeding slot of the stationary blade component of the composite knife block unit of FIG. 12 showing the end of the supply of wire after cutting of a fastener length therefrom and prior to bending of the tip thereof;

FIG. 14 is a view similar to FIG. 13 showing the tip of the wire being bent toward the longitudinal axis of the wire.

FIG. 15 is a side elevational view of the fastener inserting means of the fastener forming and inserting machine of FIG. 1;

FIG. 16 is an exploded perspective view of the plunger mounting assembly of the fastener inserting means of FIG. 15;

FIG. 17 is an exploded perspective view of the means for varying the depth of fastener insertion incorporated in the fastener inserting means of FIG. 15;

FIG. 18 is a front elevational view of the operating shaft and cams mounted thereon for actuating the fastener forming and inserting operations of the machine of FIG. 1;

FIG. 19 is an exploded perspective view of the operating shaft and cams of FIG. 18 and showing the wire cam feed and the follower elements of the various means that are operated by these cams;

FIG. 20 is an end elevational view of the operating shaft of FIG. 18 and showing the thrust cap mounted thereon;

FIG. 21 is a vertical sectional view of the cam operating shaft of FIG. 18 with the center portion broken away and showing the thrust cap of FIG. 20 at one end of the shaft and clutch means at the other end for selectively rotating the shaft;

FIG. 22 is an end view of the clutch means illustrated in FIG. 21;

FIG. 23 is an intermediate vertical sectional view of the clutch means of FIG. 22 taken parallel to FIG. 22;

FIG. 24 is a perspective view of the clutch means of FIGS. 22 and 23;

FIG. 25 is a perspective view showing in greater detail the arrangement of the special work positioning means provided in the fastener forming and inserting machine of FIG. 2;

FIG. 26 is a vertical sectional view of the pressure equalizing means of the clamping fingers of the work positioning clamping means of FIG. 25; and FIG. 27 is a vertical sectional view through the operating handle of the work positioning means of FIG. 25.

Figure 1:
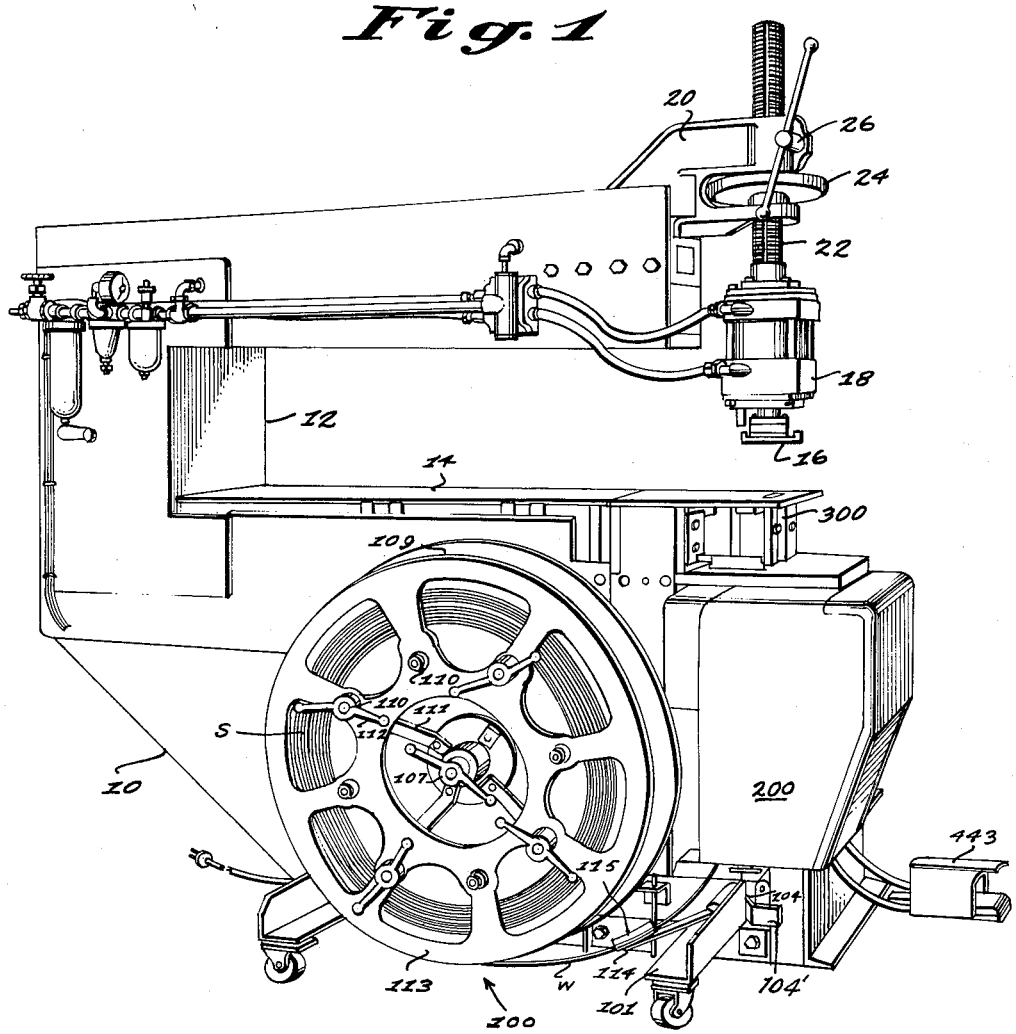
FIG. 1 is a left side perspective view of a fastener forming and inserting machine according to one embodiment of the present invention.
Figure 2:
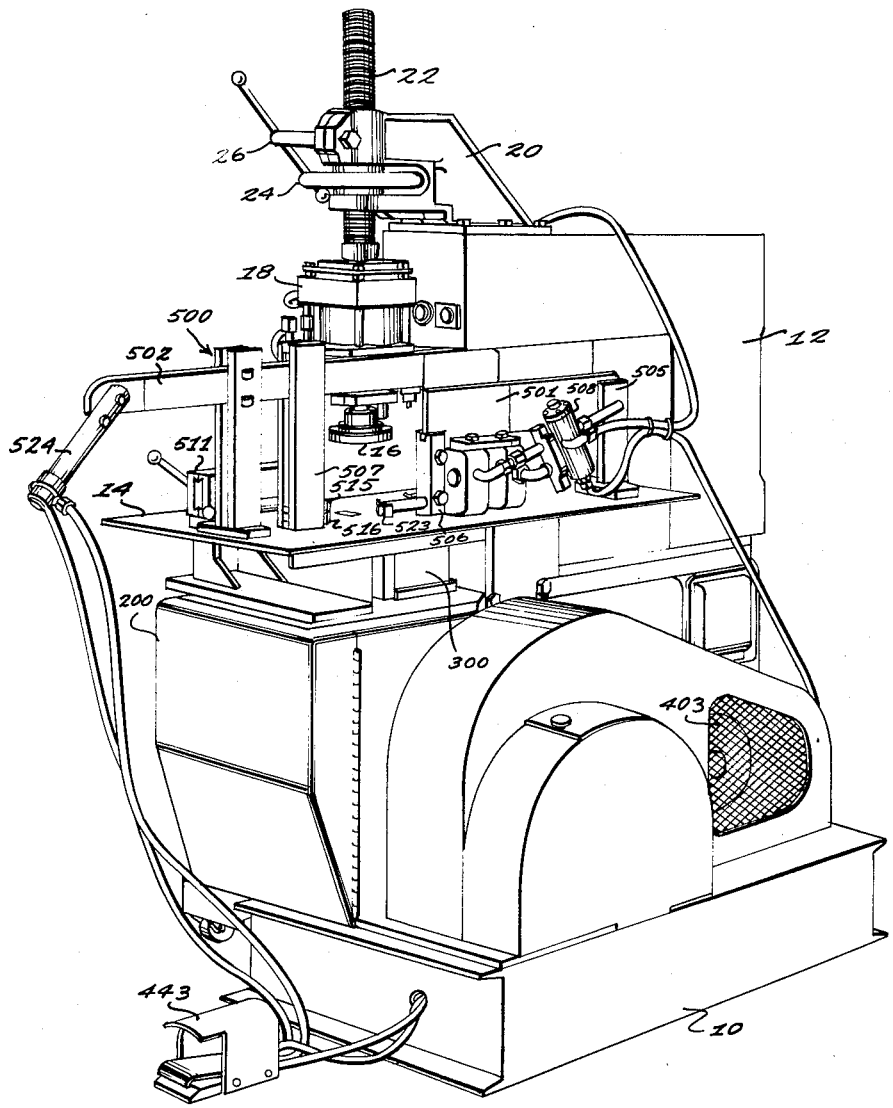
FIG. 2 is a right side perspective view of a fastener forming and inserting machine similar to the machine of FIG. 1 but including special work positioning means according to the present invention.

The embodiments illustrated in FIGS. 1 and 2 of the drawings correspond basically; the FIG. 2 embodiment differing only that it is additionally equipped with special work positioning means illustrated, as will be noted in detail presently.

In both embodiments, the basic arrangement comprises a frame structure, as indicated generally by the reference numeral 10, which is preferably formed to provide a laterally extended throat portion at 12 for accommodating work of considerable breadth in a manner comparable to that disclosed in U.S. Patent No. 3,023,412, issued March 6, 1962. Forwardly and at the lower side of this throat portion 12, a work supporting table 14 is arranged to carry work for insertion of fasteners upwardly therein against the clamping force of an overhead anvil 16, which is carried by the piston rod of a double-acting cylinder and piston unit 18 that is operated in the manner of an "air motor" to force the anvil 16 downwardly for work clamping action during fastener insertion, while maintaining it retracted upwardly so as to clear the work at other times. The anvil 16 and associated cylinder and piston unit 18 are hung from a supporting bracket 20 at the top of the frame structure 10 through a threaded shank 22 that is engaged by a handwheel 24 for adjusting the height of the anvil 12 above the work table 14 to suit the work being handled; the supporting bracket 20 being fitted with a binding screw at 26 that may be tightened for holding the threaded shank 22 at a selected adjustment.

Figure 3:
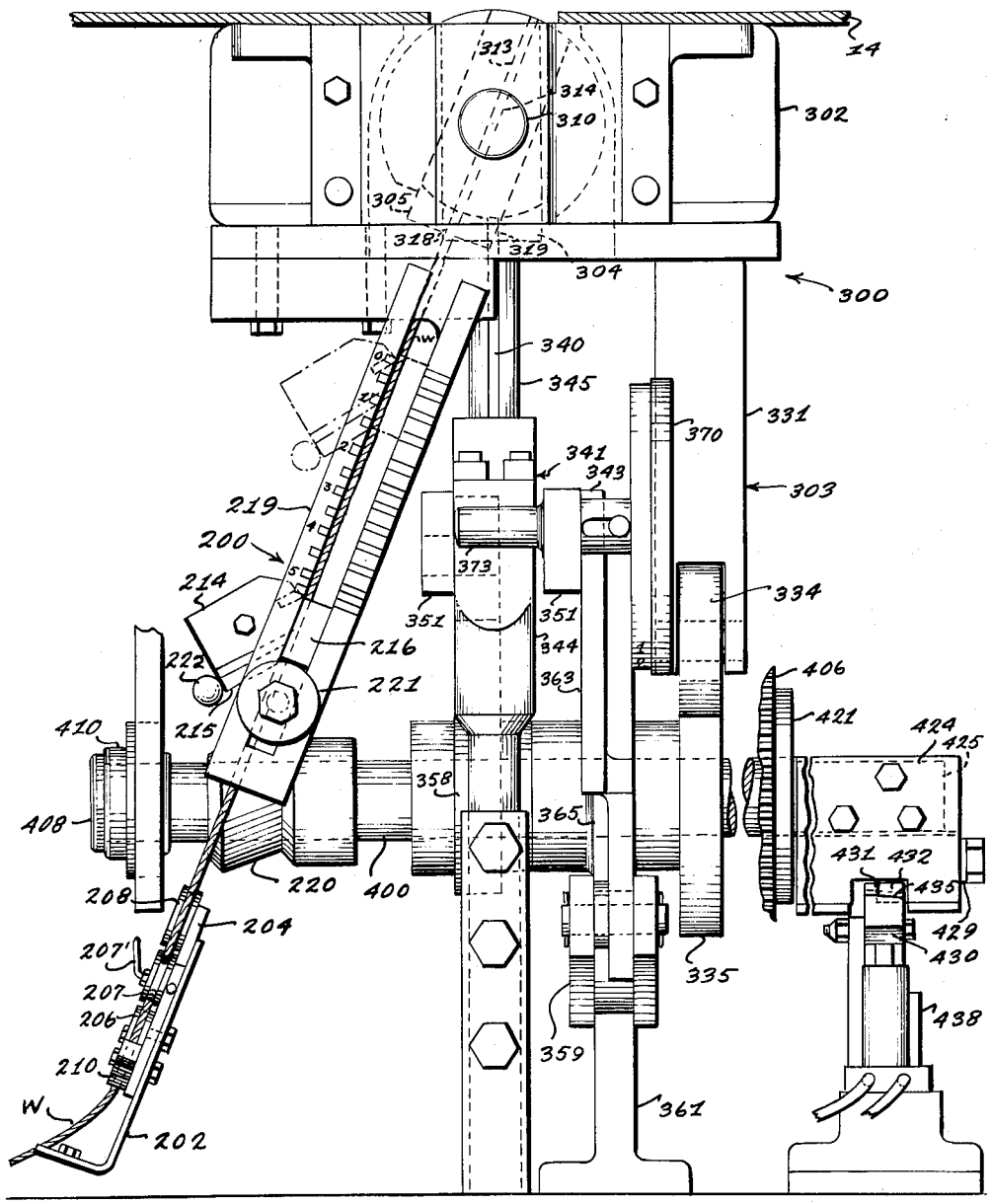
FIG. 3 is a front elevational view of the fastener forming and inserting machine of FIG. 1 with the front of the housing removed for illustration of machine components within the housing.

The supply S of wire W that is to be fed to the machine is arranged at one side thereof on a reel structure as indicated generally at 100 in FIG. 1, and feeding of the wire W is accomplished by a feed mechanism that is located adjacently on the frame structure 10 as indicated generally at 200 in FIG. 3. The fastener forming knife mechanism, which receives the feed wire W, is arranged directly below the work table 14 as seen at 300 in FIG. 3, and the cyclic fastener forming and inserting operations are actuated by a drive system that delivers through an operating shaft 400. The previously mentioned special work positioning means provided in the FIG. 2 embodiment, as generally designated by the reference numeral 500, allows supplemental horizontal clamping of the work so that it may be arranged precisely in this direction when that is necessary.

The reel structure 100, forming the supporting means for handling the considerable weight and size of the wire supply S that must be used in the machine of the present invention, is arranged on a dolly base 101 so that it may be moved away from the machine for loading readily. A back side member 102 of this dolly base 100 projects sufficiently at each end (see FIG. 5) for positioning location within the reach of a fixed bracket 103 arranged toward the rear of the machine frame 10, and a forwardly arranged latch bracket 104 having a latch arm 104' pivoted thereon for displacement to release the reel structure 100 whenever it needs to be moved away for loading.

The dolly base 101 has a three-sided form so that it is open at the side opposite the back side member 102, and an upright supporting arm 105 is attached intermediate the length of the back side member 102 to carry a horizontal spindle 106 that extends toward the open dolly base side. The extending end of the spindle 106 is shouldered and threaded to receive a wing nut 107 for positioning and retaining a hub member 108 rotatably thereon. The hub member 108 is flanged externally at 108' to have a back shroud plate 109 assembled therewith in an extent sufficient to provide sidewise support for the coiled wire supply S that must be accommodated. To carry the wire supply S at this back shroud plate 109, a spaced series of core pins 110 is fixed thereon concentrically about the hub member 108 and extending parallel with its axis. Suitable bracing as at 111 is preferably provided from the hub portion 108 to at least some of these core pins 110, and at least some of them, suitably every other one, are arranged at their extending ends to receive wing nuts 112 for positioning a front shroud plate 113 thereon to provide opposing sidewise support for the wire supply S. This front shroud plate 113 is apertured so that it may be placed freely on the core pins 110 and then tightened down by the wing nuts 112 to clamp the wire supply S against the back shroud plate 109 with sufficient firmness to prevent relative bodily shifting of the supply S during dispensing.

Such an arrangement deals in a particularly advantageous and practical way with a surprising tendency of the heavy wire coils involved here to shift during dispensing as a result of the continually repeated stopping forces that are applied in following the intermittent feeding action needed to supply the cyclic fastener forming and inserting operations. The sudden pulling force that occurs each time the intermittent feed takes place can be dampened satisfactorily in the usual manner by providing a yieldable shock absorbing means, such as a spring biased pivot arm 114 carrying a suitable wear sleeve 115 through which the wire W may be trained for feeding, and which may be conveniently arranged on the dolly base 101 as illustrated. However, when the feed stops, a very substantial inertial force must be dealt with in stopping the motion of the wire supply S that was induced by the feed, and the stiff nature of the heavy wire W tends to direct the necessary stopping force toward shifting the wire supply S in the reel structure unless this tendency is opposed. If such shifting tendency is not adequately opposed, the result is a progressive backward movement of the wire supply S in the reel structure which fouls the inner windings of the supply in a very troublesome and objectionable way, but which is eliminated entirely when the supply S is clamped against relative bodily shifting as provided for by the reel structure 100 of the present invention.

Manipulation of the reel structure 100 for loading a new wire supply S therein is accomplished simply by removing the wing nuts 112 and taking the front shroud plate 113 off of the core pins 110 so that the new supply may be set in place over their extending ends. The front shroud plate 113 is then replaced and tightened down adequately with the wing nuts 112. The arrangement of the dolly base 101 makes it possible to separate the reel structure 100 readily from the machine and move it to a wire storage area for such loading, rather than requiring the heavy wire coils to be brought to the machine for loading thereat under conditions that are almost certain to be unhandily cramped by production gear and work supplies.

The wire feeding mechanism 200, by which the wire W is intermittently drawn from the reel structure 100 and advanced to the fastener forming knife mechanism 300, is carried on the frame structure 10 in part at the reel structure latch bracket 104, which has an upwardly and outwardly angled lip portion 201 on which the foot of a standard 202 is mounted by fastening means at 203 to assume an inclination parallel with the path in which the wire W needs to be fed from the reel structure 100 at one side of the machine to the knife mechanism 300 beneath the substantial center of the work table 14.

The standard 202 has the stationary or holding portion of the feeding mechanism 200 arranged thereon, and for this purpose it carries a plate member 204 at a pivot axis 205 to float pivotally in the plane of its length and breadth within a range determined by a pair of stop pins 204' fitted in the plate member 204 to extend at each side of the standard 202. The plate member 204 in turn carries a cluster of wire straightening rolls 206, 207 and 208 thereon, together with a wire gripping blade 209 disposed to act oppositely at the first of the straightening rolls 206.

Figure 7:
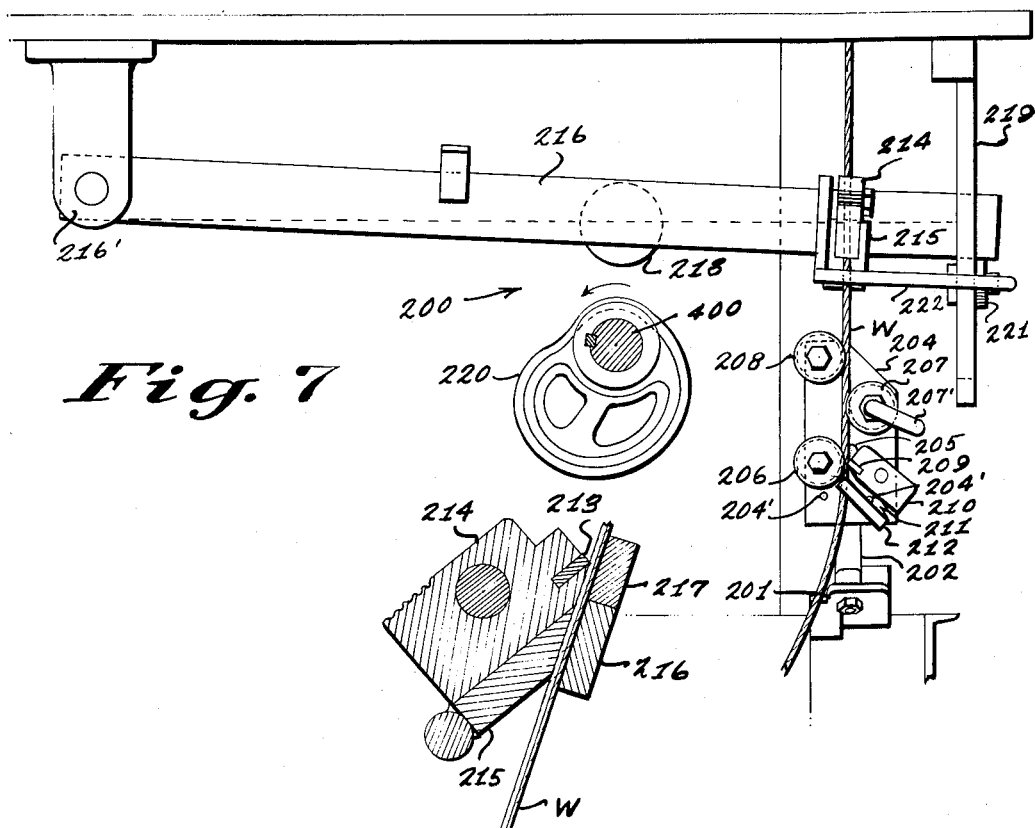
FIG. 7 is a side elevational view of the wire feeding means of the fastener forming and inserting machine of FIG. 1.
Figure 8:
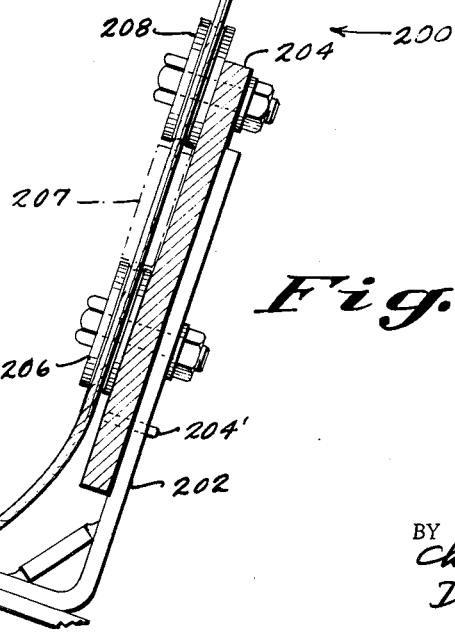
FIG. 8 is a vertical sectional view of the wire feeding means of FIG. 7 taken along the path of the wire in a plane transverse to the plane of FIG. 7.

The gripping blade 209, which is preferably of the rectangular block form disclosed in copending application Serial No. 733,222, filed April 14, 1958, is fitted in a pivoted block member 210 that is biased at 211, from a ledge element 212 on the plate member 204, to grip the wire W against movement other than in the feeding direction. The ledge element 212 is also arranged to serve as a directing guide for the wire W below the first straightening roll 206, which is located on the plate member 204 so as to have the wire gripping blade 209 act thereat just below and slightly to the left (as seen in FIG. 7) of the plate member pivot axis 205.

Upon threading the wire W into the feeding mechanism 200, the block member 210 may be pivoted readily against its bias to free the wire at the first straightening roll 206, and the second straightening roll 207 is fitted with a release arm 207' for rotating its mounting axis, which is carried eccentrically (not shown) in the plate member 204, so that such rotation results in backing-off the roll 207 to allow the wire threading to be continued easily past the final straightening roll 208 as well.

The movable or advancing portion of the feeding mechanism 200 comprises a second gripping blade 213 that is again fitted in a block member 214 which is pivoted and biased in this instance on a bracket structure 215 attached to an operating arm 216 against which the gripping blade 213 is biased to act at an insert 217 provided to withstand attrition by the wire W. The operating arm 216 reaches rearwardly of the frame structure 10 in a considerable extent to a pivoted mounting at 216', and carries a follower roll 218 intermediate its length, while having its forward end extended through a vertically slotted guide member 219. The follower roll 218 is positioned on the operating arm 216 in relation to an actuating cam 220 that is carried by the previously mentioned operating shaft 400 and that causes upward pivoting, and allows a downward pivoting return, of the operating arm 216 during each cam cycle.

Feeding of the wire W takes place during the upward pivoting stroke of the operating arm 216, and the extent of this stroke determines the length of fastener that will be formed by the knife mechanism 300. Accordingly, adjustment of the fastener length can be obtained by selectively limiting the downward pivoting extent of the operating arm 216, and provision for doing this is made by arranging a settable abutment means 221 in the vertically slotted guide member 219 below the operating arm 216. Suitable scale markings may be arranged at the front face of the guide member 219 to indicate the proper setting of the abutment means 221 for a given fastener length, and the bracket structure 215 on the operating arm 216 may be conveniently fitted with a lifting handle 222 at which the operating arm weight can be supported as the abutment means 221 is set.

In operation, the pivoted arrangement of the operating arm 216 causes the gripping blade 213 thereon to move in an arcuate path that is not very pronounced because of the considerable extent of the pivoting radius, but which nevertheless causes a slight swaying of the wire W as it is fed. Such wire sway, however, is accommodated readily by the pivotally floating arrangement of the plate member 204 on which the holding portion of the feeding mechanism 200 is arranged. The floating disposition of the plate member 204 also allows the straightening action of the rolls 206, 207 and 208 to find and maintain an aligned application with respect to the path of the wire W that is dictated by the feeding pull thereon, so that the feeding and straightening of the wire W can be handled effectively together.

In this latter connection, it should also be noted that the fastening means 203, by which the standard 202 is mounted, has a location aligned in relation to the path of the wire W through the straightening rolls 206, 207 and 208 so as to provide a pivot axis about which the standard 202 may be shifted to set the plane of the straightening roll cluster for action on the wire W in the direction that will best effect straightening as it is withdrawn from the reel structure 100.

The fastener forming knife mechanism 300, to which the above described wire feed mechanism 200 feeds the wire W is illustrated in detail in FIGS. 9–14, and is seen to include basically a composite knife unit 301 arranged in a mounting block 302 above the wire feed mechanism 200 and manipulated by an operating mechanism 303.

The composite knife unit 301 is composed of a stationary knife block 304 and a movable knife block 305 arranged as an operating pair on a common axial mounting stud 306 that extends through central bores 307 and 308 in the respective knife blocks, 304 and 305. The knife blocks are retained on the stud 306 in operating relation to form the composite knife unit 301 by an enlarged head end 309 on the stud 306 at the movable knife block 305, and a threaded collar 310 that is secured buy a pin 311 on the stud at the stationary knife block 304. Further, the stud 306 is maintained in fixed relation with respect to the movable knife block 305 for oscillation therewith by a pair of dowel pins 312 extending into both the stud head 309 and movable knife block 305 parallel with the axis of oscillation of the movable knife block. This fixing of the movable knife block 305 with the stud 306 provides alignment of a fastener receiving slot 313 extending centrally therethrough with a corresponding diametric slot 314 formed in the stud, thus providing a continuous passageway from which fasteners are driven by reciprocation of a plunger rod therein, as will be described later below.

The stationary knife block 304 has a lower portion 315 extending into a recess 316 formed at the bottom of the movable knife block 305, and at which complementary inclined working surfaces 317 extend in mating relation concentrically with the axis of oscillation of the movable knife block 305. Also, the lower portion 315 of the stationary knife block 304 is formed with a wire feeding slot 318 offset and inclined radially to extend through its oscillation axis to an intersection with the inclined working surface 317 for alignment with the aforementioned fastener slot 314 of the movable knife block 305, which also intersects the working surfaces 317. Thus, when the movable knife block is oscillated to the wire receiving position shown in dash lines on the stationary knife block 304 of FIG. 12, the wire feeding slot 318 of the stationary knife block will be aligned with the fastener slot of the movable knife block for feeding of wire W by the wire feed mechanism 200 into the movable knife block 305 for subsequent forming of a fastener therefrom. Further, the stationary knife block 304 has a plunger guiding slot 319 centrally aligned with the fastener slot 313 of the movable knife block when the movable knife block is in its upright fastener inserting position.

Oscillation of the movable knife block 305 from its inclined wire receiving position to its vertical fastener inserting position, shown in full lines in FIG. 12, causes the wire W to be cut at the working surfaces 317 to form a fastener in the movable knife block slot 313, with the inclined working surfaces forming a pointed tip 320 at the leading end of the wire W remaining in the stationary knife block slot 313. This pointed tip 320 becomes the driving or leading tip of the next formed fastener, but due to the inclination of the working surfaces 317, this tip is initially formed at one side of the wire. To displace this initial sidewise disposition of the tip 320 so that it is aligned more nearly with the lengthwise axis of the wire W to serve better as the leading tip of the next fastener to be formed, the knife unit 301 is additionally arranged to reform this tip 320 as the movable knife block 304 is shifted to fastener inserting position.

For this purpose, the wire feeding slot 318 in the stationary knife block 304 is enlarged or recessed inwardly away from the working surface 317 adjacent its inner end and with a tapering configuration from this inner end (see FIG. 13). Cooperating with the recessed enlargement 321 in the wire feeding slot 318 is a protuberance 322 extending from the recessed portion 315 of the movable knife block 305 and aligned concentrically with the enlargement 321. When the movable knife block 305 shifts to its fastener inserting position, the protuberance 322 extends into the wire feeding slot 318 and forces the remaining end of the wire W into the recessed enlargement 321, with the result that the tip 320 of the wire W is forced against the taper 323 thereof and is bent thereagainst toward the longitudinal center line or axis of the wire to a substantially central disposition, as seen in FIG. 14.

The extent of tip bending by the protuberance 322 is made adjustable by forming the protuberance as the rounded end of a screw 324 mounted in a transverse threaded bore in the movable knife block 305. Thus, this screw 324 can be advanced or retracted to set the extent of bending for the degree of reforming needed at the tip 320. To accommodate the movement of the protuberance 322 as the movable knife block 305 oscillates, the stationary knife block 304 is formed with an arcuate recess 325 coinciding with the path of the protuberance 322 and extending slightly past the wire feeding slot 318.

The knife operating mechanism 303 utilizes an axial operating member in the form of a relatively large diameter operating shaft 326 mounted for oscillation in a bore of the afore-mentioned mounting block 302, which is secured to an intermediate platform of the machine frame 10. This operating shaft 326 has an enlarged head end 327 positioned in an enlarged open end 328 of the mounting block 302. This enlarged head end 327 is diametrically slotted transverse to the axis of rotation thereof as at 327' with the sides of the slot spaced to receive the movable knife block 305, and with the shaft 326 axially recessed thereat, as indicated by the reference numeral 327", to house and position the enlarged head 309 of the knife unit stud 306.

The stationary knife block 304 is held by a removable retaining plate 329 secured by bolts or otherwise across the open end 328 of the mounting block 302 and having a central offset portion 329' in which the stationary block component 304 is received; this offset portion 329' being centrally bored for receiving the collar 310 on the knife unit stud 306.

As seen in FIGS. 9 and 10, the top of the mounting block 302 is open to allow a generally flush disposition of the movable knife block 305 at the top surface of the work supporting table 14 mounted thereabove.

The operating shaft 326 is oscillated to actuate the composite knife unit 301 by an operating arm 330 having a collar portion 330' fixed on the end of the shaft member 326 that extends rearwardly from the mounting block 302. This operating arm 330 is arranged to extend laterally radially and is bifurcated for mounting of a connecting rod 331 on a pivot pin 332 extending across the bifurcated arm. The connecting rod 331 is positioned in a vertical guide member 33 secured to and extending downwardly from the intermediate platform of the machine frame 10 and having a channel 333' therein for guiding the connecting rod 331 to reciprocate vertically as a follower roll 334 follows an operating cam 335 carried by the previously mentioned operating shaft 400; the following relation being maintained by a bias spring 336 carried at the flanged head 337 of a rod member 338 that extends downwardly from the operating arm pin 332 to dispose the spring 336 against the underside of the intermediate platform of the frame structure 10.

To drive a fastener that has been formed by the knife mechanism 300 and shifted to fastener inserting position, a driving plunger mechanism, as illustrated at 339 in FIGS. 15, 16 and 17, is arranged for operation in timed relation to reciprocate a plunger rod 340 through the passageway of the knife unit 301 in which the formed fastener is disposed at fastener inserting position. The plunger rod 340 is carried by a mounting assembly at 341, and is associated with reciprocating means 342 through connecting means 343 that provides for phase adjustment of the plunger rod 340 in relation to the reciprocating means 342 so that the fastener driving depth may be varied to allow countersinking of the inserted fasteners when desired.

The upper active end of the plunger rod 340 remains within the slot 319 of the stationary knife block 304 when retracted and the remote lower end is carried by the mounting assembly 341 to find the alignment imposed by this slot 319 and the continuing passageway through the knife unit 301 that is formed by the slot 313 of the movable knife block 305. For this purpose, the mounting assembly 341 comprises a base member 344 having a bore therethrough for sliding on a vertical guide post 345, with a mounting platform 346 secured thereon and fitted with a clamping element 347 at an upright clamping surface 346'.

The mounting platform 346 rests at its lower surface on the base member 344 and is secured thereto by bolts 348 extended through oversize apertures 348' in the platform 346 to allow a degree of horizontal shifting thereof to a desired position for securing. The clamping element 347 is slotted at 349 to receive the remote end of plunger rod 340, which is cylindrical, but the slot 349 is somewhat less than semicircular and formed at a somewhat greater diameter (or radius) than the plunger rod 340 to clamp it against the upright platform surface 346' when bolted in place. As a result, the plunger rod 340 may be installed simply by inserting it first in the passageway of the knife unit 301 to determine its necessary alignment therewith, and then clamping its remote end at the mounting assembly 341 to find and maintain this alignment.

The connecting means 343 through which reciprocation of the plunger rod 340 is actuated includes a connecting pin 350 extending into a transverse bore 344' in the mounting assembly base portion 344 to form a pivot axis for a pair of operating arms 351 at one end 352 thereof. The other end 353 of these operating arms 351 is pivotally connected with a compensating link 354 depending from a pivot mounting at 355 in a supporting yoke structure 356. A follower roll 357 is carried intermediately of the operating arms 351 in relation to an operating cam 358, arranged on the previously mentioned operating shaft 400, to actuate the working stroke of the plunger rod 340 therefrom.

The plunger recovery stroke is actuated from an additional operating arm 359 arranged below the operating shaft 400 from a pivotal mounting at 360 adjacent one end on a fixed bracket 361 to be pivotally connected at its other end 362 with a link 363 that extends upwardly to the aforementioned connecting pin 350 at the mounting assembly base portion 344, and to carry a follower roll 364 intermediate its length in relation to a further cam 365 on the operating shaft 400 that is phased to drive the recovery stroke in time with the working stroke resulting from the operating cam 358.

The driving depth adjustment for the plunger rod 340 is provided through eccentric relations at several of the pivot axes of the connecting means 343. First, an eccentric portion 355' is provided at the fixed pivot axis 355 for the compensating link 354, and this pivot axis 355 is made settable so that its eccentric portion can be used to fix the initial disposition of the operating arms 351 across the operating cam 358 to position the mounting assembly 341 so that the plunger reciprocating stroke is located to drive fasteners from the knife unit 301 without any countersinking. Then, the additional operating arm 359 is arranged for related adjustment through an eccentric connecting pin 366 at the link 363. And, finally, the connecting pin 350 at the mounting assembly 341 has axial ends 367 and 368 carried in the operating arm pair 351 and an eccentric portion 369 in the bore 344' of the base member 344.

This eccentric portion 369 is made selectively adjustable by extending one end 368 of the connecting pin 350 to carry an indexing disc 370 fixed thereto by a key pin 371, so that rotation of this disc 370 will result in changing the phase relation of the plunger reciprocation to adjust the driving depth obtained. The indexing disc 370 is suitably scaled to indicate the extent of the adjustment resulting from its rotation, and is retained at a selected scale setting by a spring loaded stop pin 372 extending from a tubular housing 373 carried on an extension 352' of one of the operating arms 351; spaced apertures 374 being arranged in the indexing disc 370 to engage the stop pin 372 at a selected scale setting.

As already noted, the wire feed mechanism 200, fastener forming knife mechanism 300, and fastener inserting means 339 are each actuated by respective cams mounted on the operating cam shaft 400. Thus the wire feed mechanism actuating cam 220, the fastener forming knife operating cam 335, and the fastener insertion stroke operating cam 358 and retraction stroke operating cam 365 of the fastener inserting means are all mounted on the common operating shaft 400. This results in a compact driving mechanism for operating all of the machine operations and simplifies the arrangement of the cams in timed relation for proper sequential actuation of the various machine operations. In addition, the mounting of the knife mechanism operating cam 335, the fastener insertion stroke operating cam 358 and the retraction stroke operating cam 365 on the common operating shaft 400 permits these cams to be arranged contiguously for interconnection to distribute the operating loads therebetween.

As seen in FIGS. 18 and 19, the retraction stroke cam 365 is positioned on the operating shaft 400 intermediate the knife operating cam 335 and the insertion stroke cam 358 in face contacting relation. These three cams are interconnected by a pair of common load bearing pins 401 extending parallel to the axis of the operating shaft through aligned pin receiving holes 402 formed in each of the three cams so that when any one of the three cams is bearing a load, the load will be transmitted to the operating cam shaft through all three cams by these common pins 401. As a result, relatively thin cams can be utilized for compactness and proper operating disposition without danger of overloading the key connections of the cams to the shaft. In addition, these common pins 401 serve to align the connected cams in proper operating relationship.

The operating shaft 400 is cyclically rotated to effect operation of the various machine components by a drive motor 403 (FIG. 2) that continuously rotates through suitable driving connection an intermediate shaft 404, which carries a pinion 405 drivingly engaging the gear teeth on a fly wheel 406 mounted for free rotation on a bearing 407 concentrically with the operating shaft 400, with the fly wheel selectively connectable to the operating shaft 400 for selective cyclical rotation thereof through clutch means which will be described in detail further below.

The operating shaft 400 and associated fly wheel 406 are retained against axial thrusts in proper operating orientation with respect to the other machine components by a thrust cap 408 mounted on the opposite end 409 of the shaft in contact with a bearing mounting 410 for retention of the shaft in proper axial disposition. This thrust cap 408 has a threaded shank 411 arranged in a threaded bore 412 in the end of the operating shaft 400, and has a flange 413 extending radially outwardly at the end of the shaft in overlapping shaft positioning contact with a sleeve 414 of the bearing in which the shaft end is mounted. The threadable engagement of the cap shank 411 in the shaft bore 412 permits axial adjustment of the cap with respect to the shaft, and thereby provides for axial adjustment of the shaft mounting with respect to the bearing. The thrust cap 408 is selectively positioned axially into the shaft end 409 by distortion of portions of the shank within the bore. This distortion is accomplished by a transverse slot 415 in the cap shank 411 with portions of the cap shank on opposite sides of the slot, which portions may be relatively distorted for locking tightly in the threaded shaft bore 412. The thrust cap 408 is formed with a longitudinal bore 416 extending therethrough across the transverse slot 415 and threaded in the cap shank portion 417 innermost within the shaft bore. The cap bore 416 is also formed with an outwardly facing seat 418 adjacent the cap flange 413 in the other portion 419 of the cap shank. The cap bore 416 receives a locking screw 420 that has an enlarged head seatable in the bore seat 418 and has a threaded end engageable with the threaded inner portion of the cap bore. Thus tightening of the locking screw 420 in the cap bore 416 causes the portion 417 of the cap shank inwardly of the transverse slot 415 to be distorted outwardly toward the other shank portion 419 so as to bind the cap shank threads tightly against the shaft bore threads and thereby lock tightly the thrust cap 408 in selected axial position with respect to the shaft. With this thrust cap construction, the operating shaft 400 and associated fly wheel 406 are retained in proper operating position against axial displacement and the thrust relationship may be readily adjusted to compensate for any axial play between the shaft and its bearing mountings.

The above mentioned clutch means for transmitting rotation of the continuously rotating fly wheel 406 to rotation of the operating shaft 400 is illustrated at the right of FIG. 21 and in FIGS. 22, 23, and 24. This clutch means includes an annular clutch plate 421 fixed to the fly wheel 406 concentric with the operating shaft 400 for continuous rotation with the fly wheel, and has four equidistant radially extending clutch pin or dog engaging slots 422 for engagement by a clutch pin 423 longitudinally slidable in a housing 424 secured to and extending radially from the flattened end 425 of the operating shaft 400. The clutch pin 423 is slidable into and out of slot engagement for selectively engaging and disengaging the operating shaft 400 from the fly wheel drive. The leading edges 426 of the clutch plate slots 422 taper inwardly to allow the clutch pin 423 to slide easily into the slots, while the trailing or driving edges 427 of the slots are parallel with the clutch pin for positive driving connection when the pin is engaged in the slot. The clutch pin 422 is biased in clutch plate slot engaging position by a spring 428 having an end mounted in a longitudinal bore of the pin and having its other end biased against a cross plate 429 at the outer end of the clutch pin housing 424.

The clutch pin or dog 423 is moved longitudinally outwardly away from the clutch plate 421 for disengagement of the operating shaft 400 from the fly wheel drive by a clutch release lever 430 that is movable into and out of the path of the clutch pin. To accomplish this clutch release manipulation of the clutch pin 423, the clutch pin is formed with an intermediate slot 431 having a lever engaging surface 432 extending from the flat front surface 433 of the pin toward the rear flat surface 434 thereof at an inclination toward the clutch plate 421. The housing 424 is open adjacent this inclined surface 432 to expose the surface for engagement by the clutch release lever 430, which is provided with a complementary inclined surface 435 in the path of the clutch pin surface. This clutch release lever inclined surface 435 is inclined outwardly in the direction of clutch pin advance so that upon engagement of the complementary inclined surfaces the clutch pin will be wedged axially outward by the interaction of the inclined surfaces to disengage the clutch pin from the clutch plate and stop the clutch pin 423 and operating shaft 400 when the pin abuts the aforementioned cross plate 429 of the clutch pin housing, which prevents further outward sliding of the clutch pin on the clutch release lever, thereby stopping operation of the machine at the end of a cycle. In this regard it should be noted that the radial location of the clutch pin 423 on the operating shaft 400 and the pin stopping position of the clutch release lever 430 are related to the knife assembly operating cam 335 carried on the operating shaft 400 so that the operating cycle is stopped with the knife assembly mechanism follower cam at the beginning of the dwell surface at which the knife assembly is in wire receiving position, the machine having thus completed a fastener insertion cycle and being in position to begin a subsequent cycle.

The clutch release lever 430 of the present invention is additionally constructed advantageously for positively retaining the clutch pin in disengaged position and preventing accidental back-up when the clutch pin strikes the clutch release lever. For this purpose, the clutch release lever 435 is formed with a leading pin engaging surface 436 in advance of the inclined surface 435 and extending generally tangentially through the path of the clutch pin so that as the clutch pin 423 advances it engages this surface 436 and causes slight depression of the clutch release lever 430 against the biasing of a vertical spring 437 that extends from the underside of the lever to a lever mounting bracket 438 on which the lever is intermediately pivoted. The clutch release lever is formed with a transverse slot 429 at the inclined surface 435 between that surface and the leading surface 436 and extending to a depth below the leading surface. This slot 439 is shaped to receive the clutch pin 423, having a flat upstanding surface 440 for engaging behind the rear flat surface 434 of the clutch pin 423 when the clutch pin has been fully disengaged by the co-action of the inclined surfaces at which time the clutch pin is received in the slot 439 to permit partial return of the depressed clutch release lever so that the clutch pin is fully seated in the slot, with the flat surface thereof contacting the rear flat surface of the clutch pin and preventing backup of the clutch pin. If no such anti-backup construction were provided, accidental backup of the clutch pin could result in undesirable movements of the operating shaft 400 and associated mechanisms, which would be particularly undesirable with the heavy duty components of the present machine.

To assure proper functioning of the clutch release lever 430, the inclined surface 435 thereof extends farther into the path of the clutch pin 423 than the leading clutch pin engaging surface 436, so that when the clutch release lever is depressed by contact of the clutch pin against the leading surface the inclined surface will remain in the path of the clutch pin for proper clutch release operation.

The operating position of the clutch release lever 430 is adjustably fixed by an adjustable positioning screw 441, against which the clutch release lever is biased by the aforementioned spring 437 in clutch operating position. The clutch release lever 430 is pivoted out of clutch pin engagement by a pneumatic cylinder-piston mechanism 442, acting on the end of the lever spaced from the clutch pin, such pivoting releasing the clutch pin to slide longitudinally under the biasing of the clutch pin spring 428 into clutch plate slot engagement for transmission of rotation of the fly wheel 406 into rotation of the operating shaft 400 for cyclical operation of the machine components.

The pneumatic cylinder-piston mechanism 442 is controlled by a valve actuated by a foot pedal 443 shown in FIGS. 1 and 2, or by actuation of the trigger of the handle of the special work clamping means described further below. An instantaneous actuation of the pneumatic cylinder-piston will allow the machine to operate through one cycle, with the clutch release lever 430 engaging the clutch pin 423 when it has completed one revolution. If continuous cyclical operation of the machine is desired, the foot pedal or hand trigger may be continuously depressed so that the pneumatic cylinder-piston is retained in lever pivoting position to retain the clutch release lever out of clutch pin engagement, thus permitting the clutch means to rotate continuously with the fly wheel through repeated machine cycle.

The special work positioning means 500 that characterizes the FIG. 2 embodiment, as previously mentioned, is additionally illustrated in FIGS. 25, 26 and 27 of the drawings, in which it is seen to comprise a slide structure 501 that includes an upper front slide element 502 and a lower rear slide element 503. Respective standards 504 and 505 are fixed on the work table 14 and fitted suitably with rollers, as at 504' and 505', to carry and guide these slide elements 502 and 503 transversely of the direction in which work is to be moved across the table 14, and at the advancing side of the overhead pressure means 16 arranged above the point in the work table 14 at which fasteners are inserted by the knife mechanism 300.

The lower rear slide element 503 carries an active clamping member 506, and the upper front slide element 502 supports a passive clamping member 507, which is equipped with set screws 507' for fixing at a work related spacing in opposition to the active clamping member 506. The active clamping member 506 is formed as a crosshead for actuation from a double acting cylinder and piston unit operated through an air manifold system, as illustrated at 508 in FIG. 25, in a manner similar to the comparable means 18 provided for the overhead clamping anvil 16.

The work in which fasteners are to be inserted is fed across the table 16 from right to left as seen in FIGS. 2 and 25, and the work table 16 is fitted with front and back stationary guides 509 and 510 that are shiftably arranged in respective clamping blocks 509' and 510' for setting to gauge the farthest backward and forward positions at which fasteners are to be inserted at any one point lengthwise of the work. Additionally, the work table 14 is preferably fitted with a starting or make-up gate 511 against which the pieces of the work to be secured can be initially arranged readily in proper relation to commence the fastener insertion. This gate 511 is mounted on the table 14 for pivoting as illustrated in FIG. 25, and carries a latch plate 512 rockably mounted thereon to dispose a nose portion 512' thereof over the table edge to maintain it open when not in use. The same nose portion 512' serves alternatively to engage a slot in the table 14 to locate the active position of the gate 512 as indicated by dash lines in FIG. 25. The free end of gate 512 advantageously carries a post structure 513 on which a swinging supplemental gauge finger as at 514 is arranged for selective use when one piece of the work being handled needs to have its end staggered with respect to that of another piece.

Upon initial arrangement of the work on the table 14 to commence fastener insertion, the transversely shiftable arrangement of the lateral clamping means 500 will allow it to assume a straddling relation at the work position dictated by either of the front or back guide members 509 and 510, and to follow any further positioning of the work for fastener insertion at shifting stages between these guides 509 and 510. The service performed by the lateral clamping means 500 is that of arranging the work pieces sidewise in proper relation in preparation for the fastener insertion. Such lateral preparation is particularly useful when the work pieces being handled are subject to any appreciable degree of warpage, for the lateral clamping acts to eliminate the warpage of one piece as it is progressively clamped and secured to another.

Also, the lateral clamping means 500 may be employed to exceptional advantage in forming housing sub-components in which the relative lateral arrangement of the work pieces often has important significance. Thus, it may be necessary to maintain two work pieces closely aligned at one side, and even to do this when the work pieces are not of equal width. In such a case the passive clamping member 507 may have individual abutment elements 515 and 516 installed thereon to act against the respective work pieces about a pivot pin 517 through an equalizing rocker 518, so that the lateral clamping force is equalized on both work pieces to force a flush side edge alignment at the active clamping member 506. Such abutment elements 515 and 516 may be disposed in place by an assembly pin 519 grooved intermediate its length for pressing to a seated relation with a ball 520 backed by a bias spring 521 in the element 516 bearing against a barrier means 522 extending from the element 515 with suitable clearance slotting to maintain the elements 515 and 516 free for relative shifting.

Additionally, instead of maintaining a flush side edge alignment as noted above, it may be necessary to space one side edge inwardly of another at a constant relation, as when a ledger is to be attached to a girder. For this purpose, the active clamping member 506 is arranged to carry an auxiliary clamp element 523 extending at a fixed spacing therefrom for application to the work piece that needs to be spaced from another being positioned normally by the clamp member 506.

Finally, the slide structure 501 is fitted with a manipulating handle 524 at the forward end of the upper front slide element 502 so that the transverse shifting of the clamping means 500 may be controlled readily, and this handle 524 preferably houses a trigger 525 at which the operating cycle of the machine may be actuated alternatively, rather than using the foot pedal 443. Upon actuation of an operating cycle, either at the handle trigger 525 or the foot pedal 443, the lateral clamping means 500 and the overhead pressure means 16 are then actuated in timed relation to the fastener inserting operation in a manner such as is disclosed in U.S. Patent No. 3,008,143, issued November 14, 1961.

The present invention has been described in detail above for purposes of illustration only and is not intended to be limited by this description or otherwise except as defined in the appended claims.

We claim:

1. In a fastener forming and inserting machine incorporating a fastener forming knife mechanism in which a movable knife element is shifted between a first position, at which it is aligned with a stationary knife element for receiving wire to cut a fastener therefrom, and a second position, at which the cut fastener is aligned between said knife elements at a passageway therethrough for insertion into a work piece, the improvement which comprises a plunger rod for driving said fastener through said passageway into said work piece, means for reciprocating said plunger rod to effect said driving, and means for clamping the remote end of said plunger rod to said reciprocating means, said clamping means being shiftable with respect to said reciprocating means when loose for finding the position of said remote plunger end upon tightening as determined by the alignment imposed by said passageway through said knife elements.

2. In a fastener forming and inserting machine, the improvement defined in claim 1 and further characterized in that said remote plunger rod end is cylindrical, in that said clamping means incorporates a positioning member having a first surface parallel to the cylindrical axis of said plunger rod end and a second surface right angularly transverse thereto, means for clamping the remote plunger rod end to said first surface, and means for connecting said positioning member to said reciprocating means at said second surface.

3. In a fastener forming and inserting machine, the improvement defined in claim 1 and further characterized in that said reciprocating means incorporates means to guide said clamping means for reciprocation of said rod in said found position, said clamping means being pivotally connected to one end of an operating arm, the other end of said operating arm is pivotally connected to one end of a compensating link that is pivoted at its other end to said machine, and an actuating cam engageable with said operating arm intermediate its ends to reciprocate said rod, the pivot axis of said compensating link at said other end being eccentrically settable to determine the location of the reciprocation stroke of said rod.

4. In a fastener forming and inserting machine, the improvement defined in claim 3 and further characterized in that said pivotal connection between said operating arm end and said clamping means is eccentrically settable, and in that means is provided for adjusting the position of said eccentric to set the relation of the plunger rod reciprocation with respect to the motion of said operating arm.

5. In a fastener forming and inserting machine, the improvement defined in claim 3 and further characterized in that said actuating cam moves said plunger rod to drive a fastener, a second operating arm is pivotally mounted at one end to said machine and pivotally connected at its other end to said clamping means, and a second cam engages said second operating arm intermediate its ends to return said plunger rod, the pivot axis at one end of said second operating arm incorporates a settable eccentric for relating the position of said second operating arm to said second cam.

6. In a fastener forming and inserting machine incorporating a fastener forming knife mechanism in which a movable knife element is shifted between a first position, at which it is aligned with a stationary knife element for receiving wire to cut a fastener therefrom, and a second position, at which the cut fastener is aligned between said knife elements at a passageway therethrough for insertion into a work piece, and in which a plunger element is reciprocated through said passageway for driving said fastener therefrom into said work piece, the improvement which comprises an operating shaft, a plurality of cams mounted on said shaft for actuating said knife shifting and plunger reciprocation, means keying said cams on said shaft, said operating shaft being carried in spaced bearing units and having a hollow end portion adjacent one of said bearing units, a flanged plug inserted in said hollow end portion for disposing the flanging thereon at said bearing unit to locate said shaft thereat, the inserted portion of said plug having a transverse slot cut intermediately therein, and said plug being fitted with means for flexing the body of said plug at said slot and thereby binding it within said hollow end portion to maintain a desired disposition of said flanging.

7. In a fastener forming and inserting machine having a work supporting table and means thereat for inserting fasteners into work supported thereon, the improvement which comprises vertically movable means for pressing downwardly on the work to hold it on said table during fastener insertion, and means acting laterally on said work for clamping it in preparation for and during said fastener insertion.

8. In a fastener forming and inserting machine, the improvement defined in claim 7 and further characterized in that said lateral clamping means is mounted on said table for shifting transversely with respect to said fastener inserting means.

9. In a fastener forming and inserting machine, the improvement defined in claim 8 and further characterized in that said lateral clamping means comprises a slide structure, an active clamping member carried by said slide structure for selective positioning thereby, a passive clamping member also carried by said slide structure for selective positioning thereof at a work related spacing in opposition to said active member, and means for selectively actuating said active member to exert said lateral clamping action on interposed work against said passive member.

10. In a fastener forming and inserting machine, the improvement defined in claim 9 and further characterized in that said actuating means includes a manually operable control element incorporated in a manipulating handle portion of said slide structure.

11. In a fastener forming and inserting machine, the improvement defined in claim 9 and further characterized in that said actuating means also activates said vertically movable means, and initiates operation of said fastener inserting means.

12. In a fastener forming and inserting machine, the improvement defined in claim 9 and further characterized in that said passive clamping member carries a plurality of shiftably mounted abutment elements thereon for abutment with respective pieces of composite work supported on said table and includes means acting to equalize the lateral clamping force among said abutment elements.

13. In a fastener forming and inserting machine, the improvement defined in claim 12 and further characterized in that said active clamping member has an auxiliary clamp element extending a fixed distance therefrom for abutment with one piece of said composite work to determine its location in relation to another piece of said composite work.

References Cited by the Examiner

UNITED STATES PATENTS

| | | | |
|---|---|---|---|
| 1,045,153 | 11/1912 | Kennedy | 248—70 |
| 1,119,510 | 12/1914 | Heim | 226—129 |
| 1,167,764 | 1/1916 | Liebig | 226—157 |
| 1,403,480 | 1/1922 | Blood | 74—53 |
| 2,379,771 | 7/1945 | Weidauer et al. | 74—567 |
| 2,411,293 | 11/1946 | Roehner | 242—55.2 |
| 2,566,104 | 8/1951 | Wright et al. | 10—43 |
| 2,636,168 | 4/1953 | Wright et al. | 1—29 |
| 2,684,490 | 7/1954 | Wright et al. | 10—43 |
| 2,723,011 | 11/1955 | Havir | 192—25 |
| 2,871,479 | 2/1959 | Wright et al. | 1—29 |
| 2,901,068 | 8/1959 | Tipper | 192—25 |
| 2,944,758 | 7/1960 | Wright et al. | 242—129 |
| 2,952,495 | 9/1960 | Herr | 287—20 X |
| 3,008,143 | 11/1961 | Bagwell et al. | 1—356 |
| 3,100,301 | 8/1963 | Black | 1—149 X |

GRANVILLE Y. CUSTER, JR., *Primary Examiner.*